United States Patent
De Greef

(10) Patent No.: US 6,742,647 B2
(45) Date of Patent: Jun. 1, 2004

(54) APPARATUS AND METHOD FOR CONVEYING AND/OR TRANSFERRING FRUITS

(75) Inventor: Jacobus Hendrik De Greef, Waardenburg (NL)

(73) Assignee: De Greef's Wagen-, Carrosserie- en Machinebouw B.V., Tricht (NL)

( * ) Notice: Subject to any disclaimer, the term of this patent is extended or adjusted under 35 U.S.C. 154(b) by 0 days.

(21) Appl. No.: 09/951,891

(22) Filed: Sep. 13, 2001

(65) Prior Publication Data
US 2002/0041801 A1 Apr. 11, 2002

(30) Foreign Application Priority Data
Sep. 14, 2000 (NL) ............................................. 1016186
Oct. 20, 2000 (NL) ............................................. 1016453

(51) Int. Cl.⁷ ..................... B65G 25/00; B65G 29/00; B65G 37/00; B65G 47/84; B65G 47/86
(52) U.S. Cl. ................. 198/470.1; 198/370.3; 198/803.7
(58) Field of Search ................. 198/370.03, 370.04, 198/370.09, 459.8, 470.1, 803.7, 803.9; 209/912

(56) References Cited

U.S. PATENT DOCUMENTS

| | | | |
|---|---|---|---|
| 3,330,400 A | | 7/1967 | Alexander |
| 3,370,691 A | * | 2/1968 | Mostard ................. 198/803.9 |
| 3,837,474 A | | 9/1974 | Brooke |
| 3,884,184 A | | 5/1975 | Arrandale et al. |
| 4,087,970 A | * | 5/1978 | Slazas et al. ................ 60/487 |
| 4,262,795 A | | 4/1981 | Hecker |
| 4,411,366 A | | 10/1983 | De Greef |
| 4,488,637 A | | 12/1984 | Loeffler |
| 4,823,934 A | | 4/1989 | Lemaire et al. |
| 4,830,195 A | | 5/1989 | De Greef |
| 4,965,982 A | * | 10/1990 | Jesperson et al. ........... 198/839 |
| 5,117,966 A | * | 6/1992 | Kuhn et al. .............. 198/468.1 |
| 5,267,654 A | | 12/1993 | Leverett |
| 5,611,437 A | * | 3/1997 | Okada ........................ 198/704 |
| 5,626,236 A | * | 5/1997 | Hiebert .................. 198/370.02 |
| 5,630,311 A | | 5/1997 | Flix |
| 5,703,332 A | * | 12/1997 | Tas ........................ 198/803.9 |
| 6,234,300 B1 | | 5/2001 | De Vos et al. |

FOREIGN PATENT DOCUMENTS

| | | |
|---|---|---|
| EP | 0230583 A2 | 8/1987 |
| EP | 0 471 401 A | 2/1992 |
| EP | 0647561 A1 | 4/1995 |
| EP | 0 687 508 A | 12/1995 |
| EP | 0687508 A1 | 12/1995 |
| WO | WO 95/08475 | 3/1995 |
| WO | WO 97/42112 A | 11/1997 |

* cited by examiner

Primary Examiner—Gene O. Crawford
(74) Attorney, Agent, or Firm—Needle & Rosenberg, P.C.

(57) ABSTRACT

An apparatus for conveying and/or transferring relatively vulnerable products, such as fruits, wherein the fruits are held in grippers while being conveyed and transferred. The grippers comprise a first gripper portion and a second gripper portion, which are movable over sliding elements substantially in the direction in which the gripping force is exerted on the products.

23 Claims, 9 Drawing Sheets

APPARATUS AND METHOD FOR CONVEYING AND/OR TRANSFERRING FRUITS

CROSS-REFERENCE TO RELATED APPLICATIONS

This application claims priority to The Netherlands Application NL 1016186 filed Sep. 14, 2000, and The Netherlands Application NL 1016453 filed Oct. 20, 2000, which applications are herein incorporated by reference in their entirety.

BACKGROUND OF THE INVENTION

The sorting of fruits takes place at increasingly higher speeds, for example at speeds of 7–15 fruits per second. Because of said high speeds, the fruits may be damaged upon being transferred from a first conveyor to a second conveyor, which is undesirable.

From European patent application EP A 0 687 508 there is known a conveyor which is fitted with grippers. Said grippers are used for conveying products to individual stations. Consequently, a relatively large number of gripping hands are required. Furthermore, flexible arms are used on the grippers so as to be able to engage fruits of varying diameter.

SUMMARY OF THE INVENTION

The present invention provides an apparatus for conveying and/or transferring relatively vulnerable products, such as fruits, wherein the fruits are held in grippers while being conveyed and transferred, wherein said grippers comprise a first gripper portion and a second gripper portion, which are movable over sliding elements substantially in the direction in which the gripping force is exerted on the products.

Furthermore, the present invention provides an apparatus for transferring vulnerable products, such as fruits, from a supply conveyor to a discharge conveyor, wherein said fruits are held in grippers and wherein the said products that are present in said grippers are weighed while being transferred.

Preferably, a pivoted suspension on the outer side is used, so that it is possible to use a three-point support so as enable a stable weighing process. Furthermore, the bearing sliding surfaces for said three-point weighing are preferably spaced apart as far as possible.

The present invention also provides a method for conveying and discharging one or more fruits, wherein:

the fruits are separated from each other in a singling device;

the individual fruits are taken out of said singling device by means of grippers and transferred to a conveyor fitted with product carriers, during which transfer the individual fruits are weighed; and wherein said fruits are discharged from the conveyor with the product carriers, by tilting said product carriers and causing the fruits to move past a flexible element.

The above method enables a relatively simple construction of the appropriate apparatus, in particular of the conveyor fitted with product carriers, since weighing takes place in the grippers.

With a view to obtaining a calibration hallmark, it is important that the apparatus be standardized, that is, that a fixed number of parts and a fixed length of (a weighing portion of) the apparatus are used.

It is possible, however, to set a different track width, for example by adjusting the pin length, for example for fruits ranging in a diameter between 22 mm and 250 mm.

In the past, the applicant furthermore marketed an apparatus wherein fruits were sorted and discharged at specific positions in dependence on measured quantities, such as weight, size, colour and the like. A slab of a flexible material was used during the discharge of the fruits so as to reduce the velocity thereof. Since the fruits were weighed in the fruit carriers, said slab was in fact detached from the cup or fruit carrier and it was fitted near the front side thereof—seen in the conveying direction. As a result, said slab had a considerable length of about 30 cm, for example, which caused quite some inconvenience in the device when discharging took place into water channels, because the long slabs scooped up (a great deal of) water. In dry discharging situations, the long slab had an abrasive effect on the fruits, which had an negative effect on the quality of said fruits.

The present invention furthermore provides an apparatus for conveying and discharging vulnerable products, such as fruits, comprising:

product carriers that can be moved in the conveying direction;

tilting means for causing the product carriers to tilt at a specific conveying position, so as to discharge the product from the product carrier in rearward direction, seen in the conveying direction, at said conveying position;

wherein a product carrier is provided laterally of a conveying element, wherein the product carrier can be returned to the conveying position after the fruit has been discharged, and wherein a flexible element is disposed on the rear side of the product carrier for the purpose of discharging the product from the product carrier in a controlled manner.

The apparatus according to the present invention has been optimized for conveying and discharging fruits, both in the situation in which the products are carried off without water being used and in the situation wherein water channels are used. With the apparatus according to the invention, the weighing process has preferably taken place already, so that it is possible to attach a much shorter slab, for example a slab having a length of 15 cm, to the rear edge.

The apparatus according to the present invention does not produce much noise, not even at high speeds. The present invention makes it possible to conveyor more than five fruits (such as apples) per second, for example 7–9 fruits per second, wherein the construction of the apparatus and the controlled discharging speed prevent vulnerable fruits being damaged. Preferably, the fruits are placed into the carriers by grippers, as a result of which the quality, for example of apples, remains ensured, even at the aforesaid high speeds.

In one preferred embodiment, each product carrier is furthermore provided with a snap mechanism for discharging the fruits in a reliable manner and pushing the product carrier back into the conveying position and securing it in said position as soon as possible after a product has been discharged, so that the slab need not drag over next products and will not scoop water in the situation wherein water is used.

In another preferred embodiment, a product carrier is approximately S-shaped in section, seen in the conveying direction, which has appeared to be the most advantageous shape for various types of fruits having varying dimensions. The fruit is properly engaged (on the convex surface thereof), using the lowest possible pressure forces, whilst discharging is facilitated.

In order to enable the gripping hands to engage properly, the product carrier has an approximately S-shaped profile in cross-sectional view as well.

The present invention furthermore provides a method for conveying and discharging one or more fruits, wherein:

products carriers containing fruits are moved in the conveying direction;

the respective product carriers are tilted at specific conveying positions, and the respective fruits are discharged in rearward direction from said product carriers into a water channel; and wherein the fruit is slowed down upon being discharged by means of a flexible element which is attached to the rear edge of the product carrier.

This method, which is preferably carried out in combination with the apparatus according to claims 12 and 13, enables a practical realisation of such an apparatus, since the trouble which the water causes to the chain and other parts of the conveyor is significantly reduced.

DESCRIPTION OF THE FIGURES OF THE DRAWINGS

Further advantages, aspects and details of the present invention will be elucidated in the description hereafter, in which reference is made to the appended drawings, wherein.

DETAILED DESCRIPTION OF THE INVENTION

Figure 2:
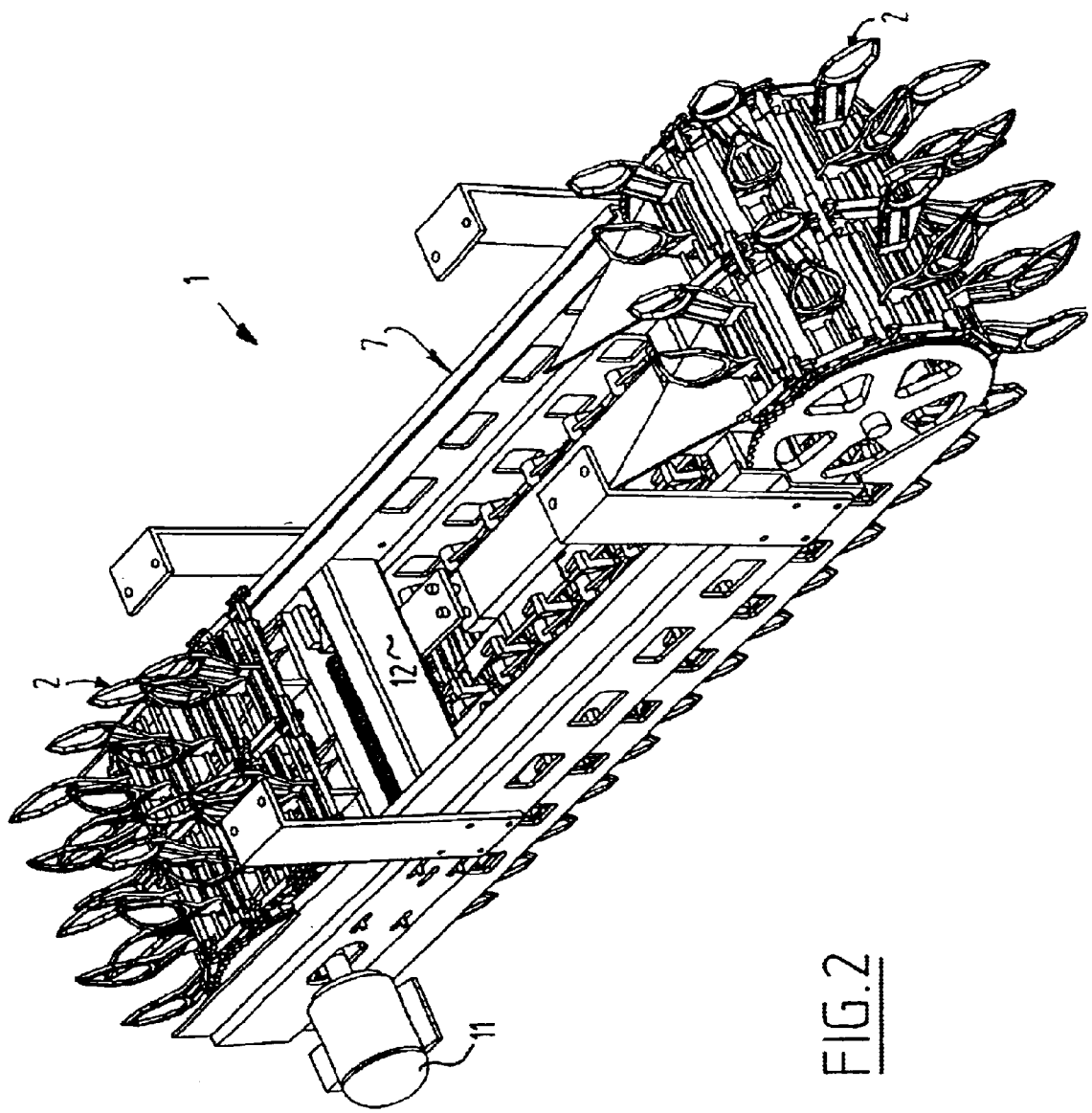
FIG. 2 is a perspective top plan view of the apparatus of FIG. 1.
Figure 3:
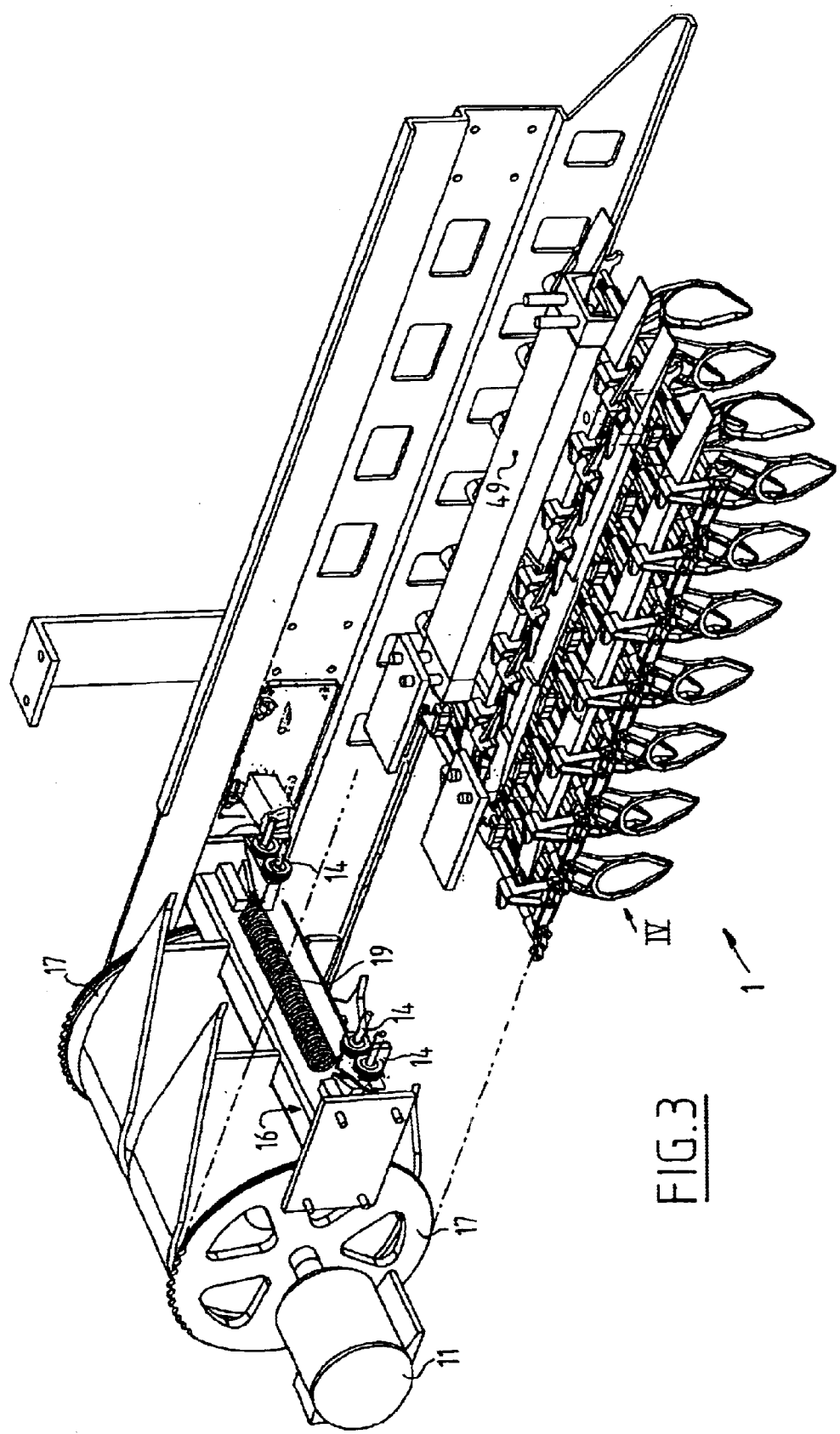
FIG. 3 is a partially broken-away, perspective view of the apparatus of FIGS. 1 and 2.

A device 1 (FIGS. 1, 2 and 3) comprises a fixed number of gripping hands 2, thirty-four pairs in the present embodiment, for transferring fruits that are being supplied in the direction indicated by arrow A by a first conveyor 3 to a second conveyor 4, wherein the fruits are carried off in fruit carriers 5 in the direction indicated by arrow B. Fruits that are not suitable for direct consumption can be discharged, for example via a third discharging conveyor 6. The device furthermore comprises a frame 7, with chain wheels for endless chains, to which the gripper hands are attached, being suspended therein.

Figure 4:
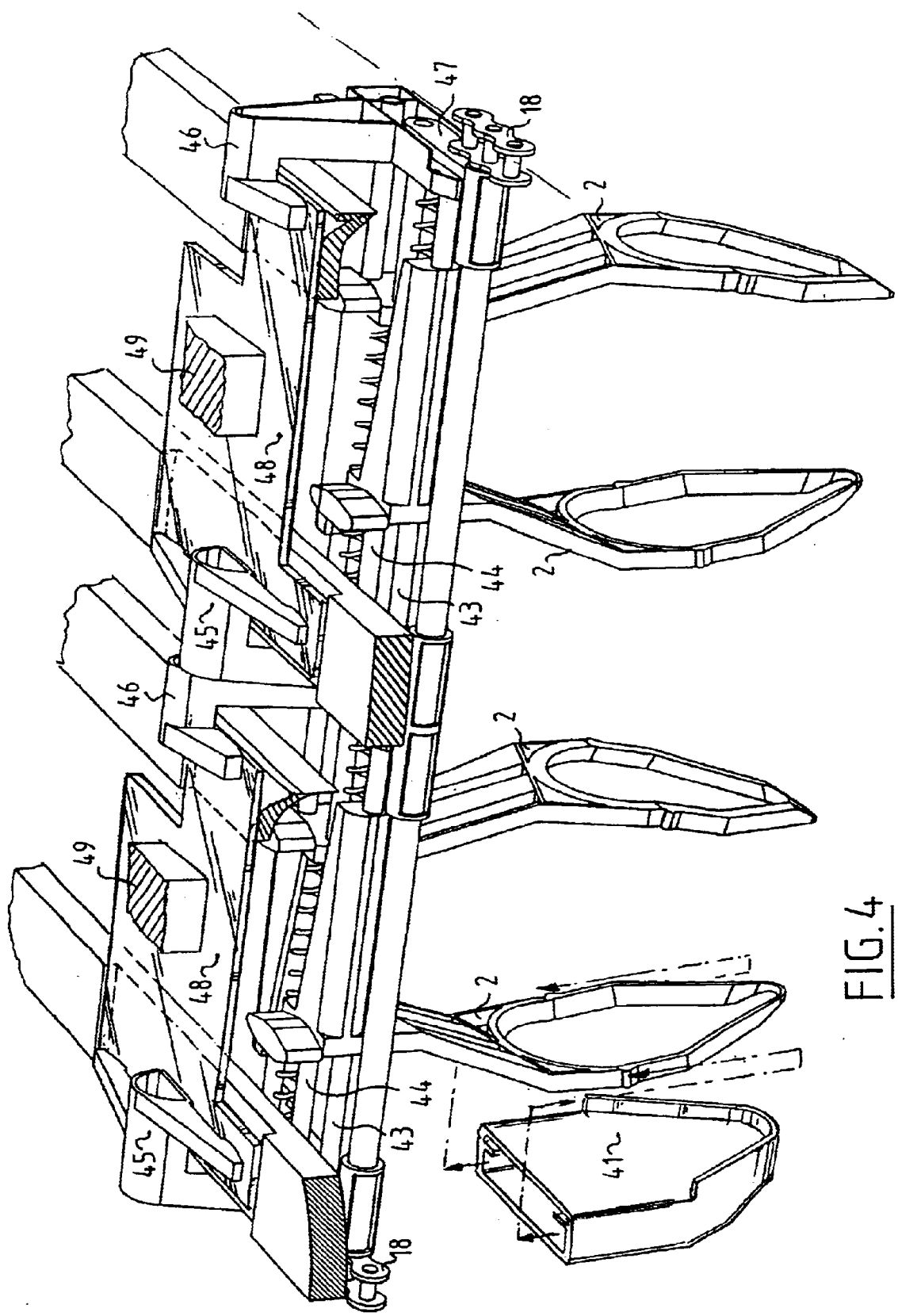
FIG. 4 is a perspective view of detail IV of FIG. 3.

The open gripper hands 2 are preferably each provided with a cover 41 (see FIG. 4) of a soft material so as to enable a proper engagement of the fruits V whilst minimizing the risk of damaging the fruits. As is clearly shown in FIGS. 2 and 3, device 1 comprises a motor 11 for driving chains 18 with the gripper hands attached thereto, as well as a chain tensioning device 12, which is fitted with a coil spring 19 (FIG. 3) and cup springs 14 for the purpose of compensating for changes in the length of the chain as much as possible. A first part 15 of said chain tensioning device 12 (FIG. 3) is spaced from a second part 16, which is fixedly connected to the mounting bracket for the chain wheel 17 to which the driving motor 11 is connected. The cup springs 14, coil spring 19 and the possibility of movement along the sloping surfaces thus enable springing movement of the part 16 comprising the motor and the chain wheels. The first part 15 is fixedly connected to the frame.

The respective gripper hands 2 that are fitted between chains 18 are movable over pins 43 and 44 (FIG. 4) in a direction transversely to the conveying direction. As is also apparent from FIGS. 5 and 6B, the respective gripper hands are suspended from pins 43, 44. Said pins are fixed to the frame parts 45 and 46, which are connected to the chain in such manner as to be capable of slight pivoting movement, which movement is made possible by knee 47, among other parts.

Figure 5:
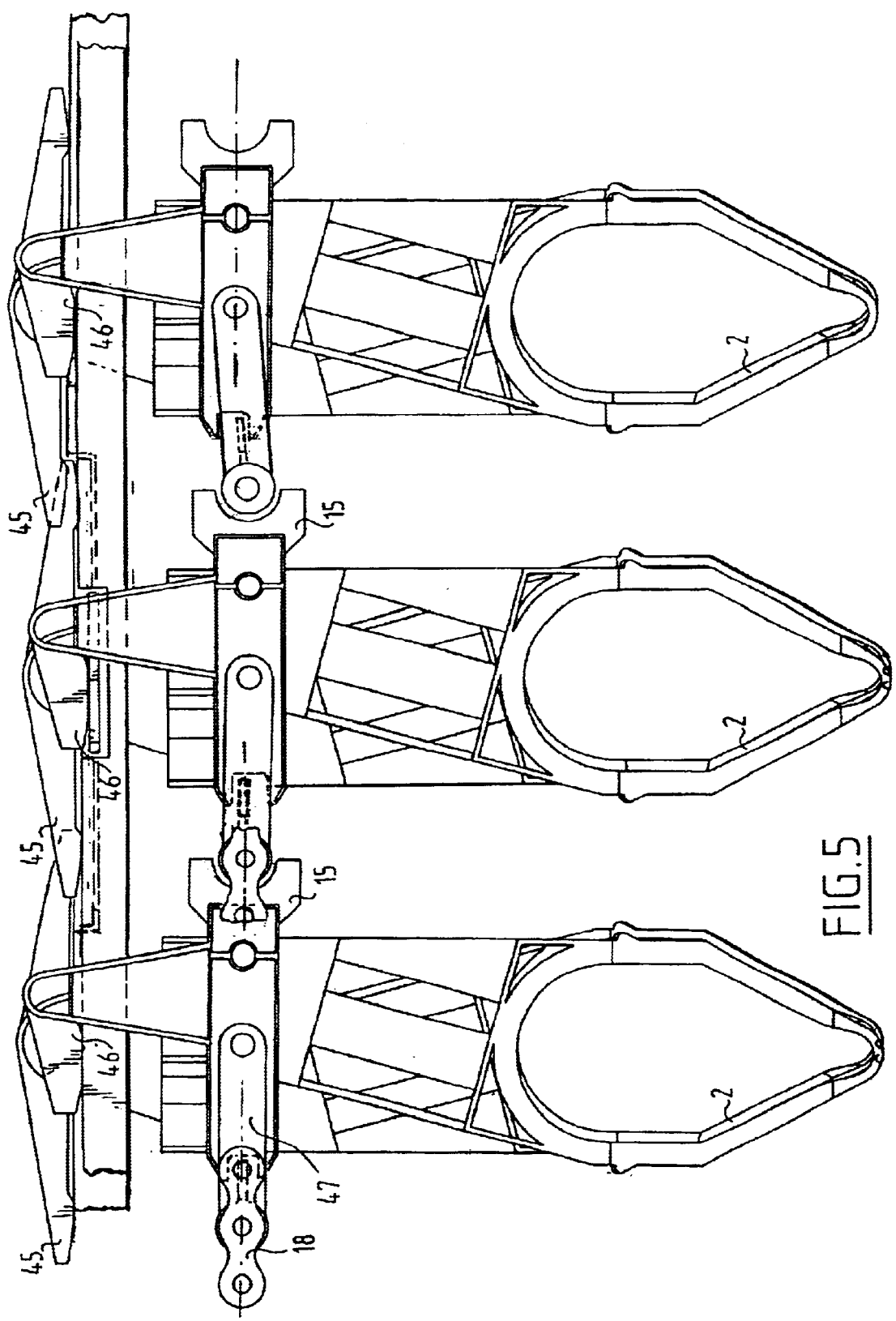
FIG. 5 is a side elevation of the detail of FIG. 4.

Furthermore, connecting pieces 51, see also FIG. 5, are provided between successive pairs of gripper hands for the purpose of allowing vertical movements between successive pairs of gripper hands.

Three supporting surfaces present at the bottom side of frame parts 45 and 46 are each passed over a platform 48 that forms part of a so-called load cell 49 for weighing a fruit which is held by the gripper hands. As the number of gripper hands is limited, it is certainly within the bounds of the possible that in the future a calibration hallmark will be obtained for this accurate manner of weighing products. At present, calibrated weighing generally takes place manually in the final packaging. Since the apparatus according to the present invention comprises a limited number of gripper hands, for example 25–100, the cost that is involved can remain within bounds.

Frame parts 45 and 46 are preferably made of an easily sliding or resilient plastic material. Experiments have furthermore shown that in the case of speeds of up to 15 fruits per second, 10–50 msec are available for determining the weight in an accurate and stable manner, which is made possible by the three-point support.

Figure 6A:
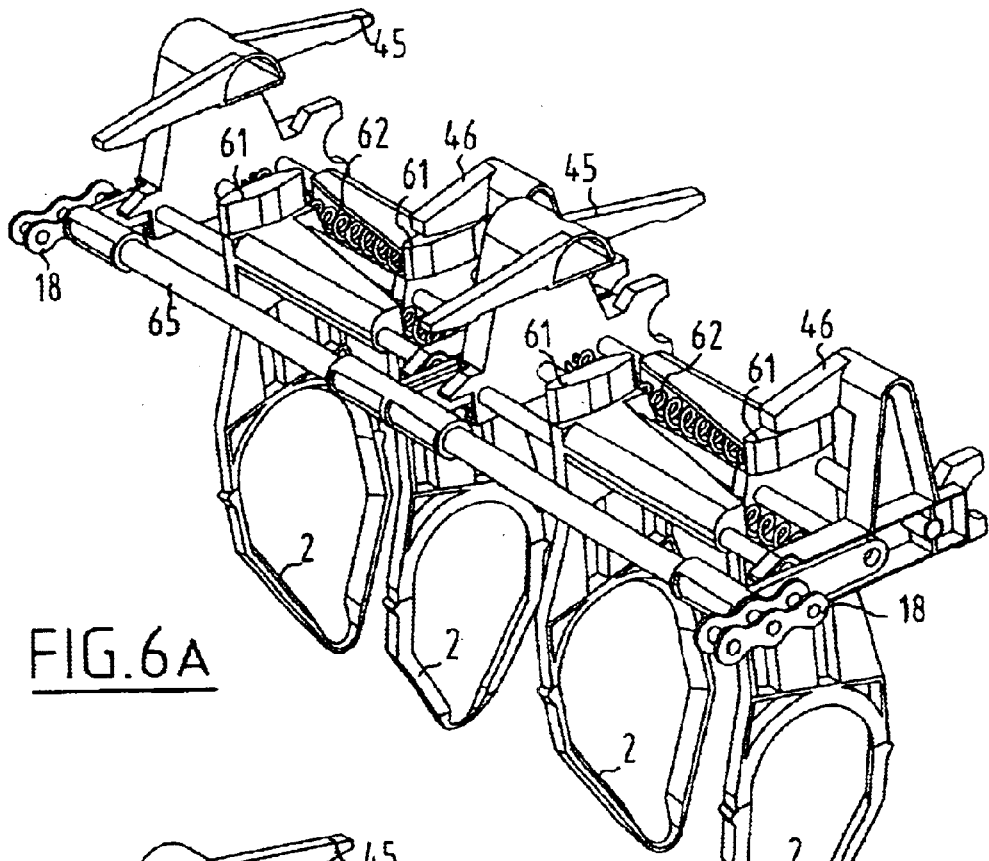
FIGS. 6A and 6B are perspective views of the elements of FIGS. 4 and 5, respectively showing the open position and the closed position thereof.
Figure 6B:
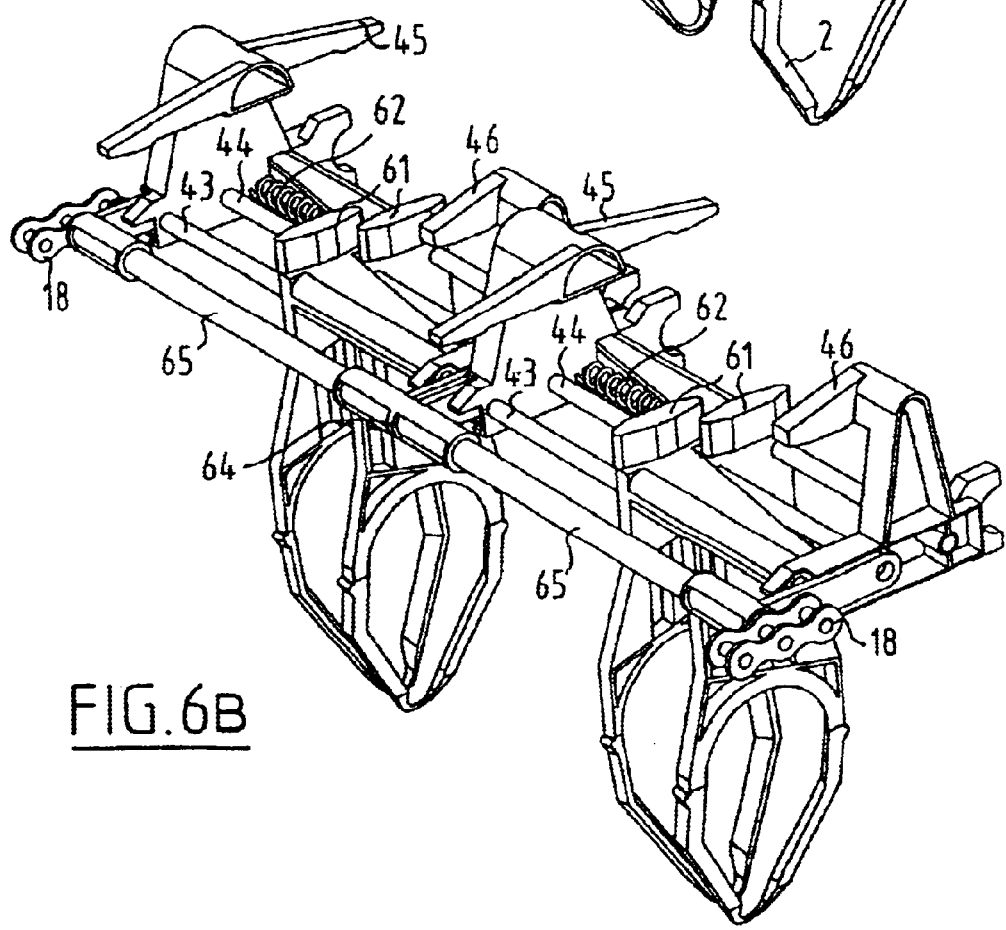

Gripper hands 2 are movable from an open position as shown in FIG. 6A to a closed position as shown in FIG. 6B by means of cams 61, which are movable, along with the gripper hands 2, over sliding rods 43 and 44 against the action of a coil spring 62. The supporting parts 45 and 46 for weighing are pivotally connected to chains 8, whilst the knees 47 that are fitted between the two pairs can pivot independently of each other. Parts 45 and 46 are thus pivotally connected to pins 65, which are each fixedly connected to chains 18 so as to ensure independent weighing of the pairs that are positioned adjacently to each.

Figure 1:
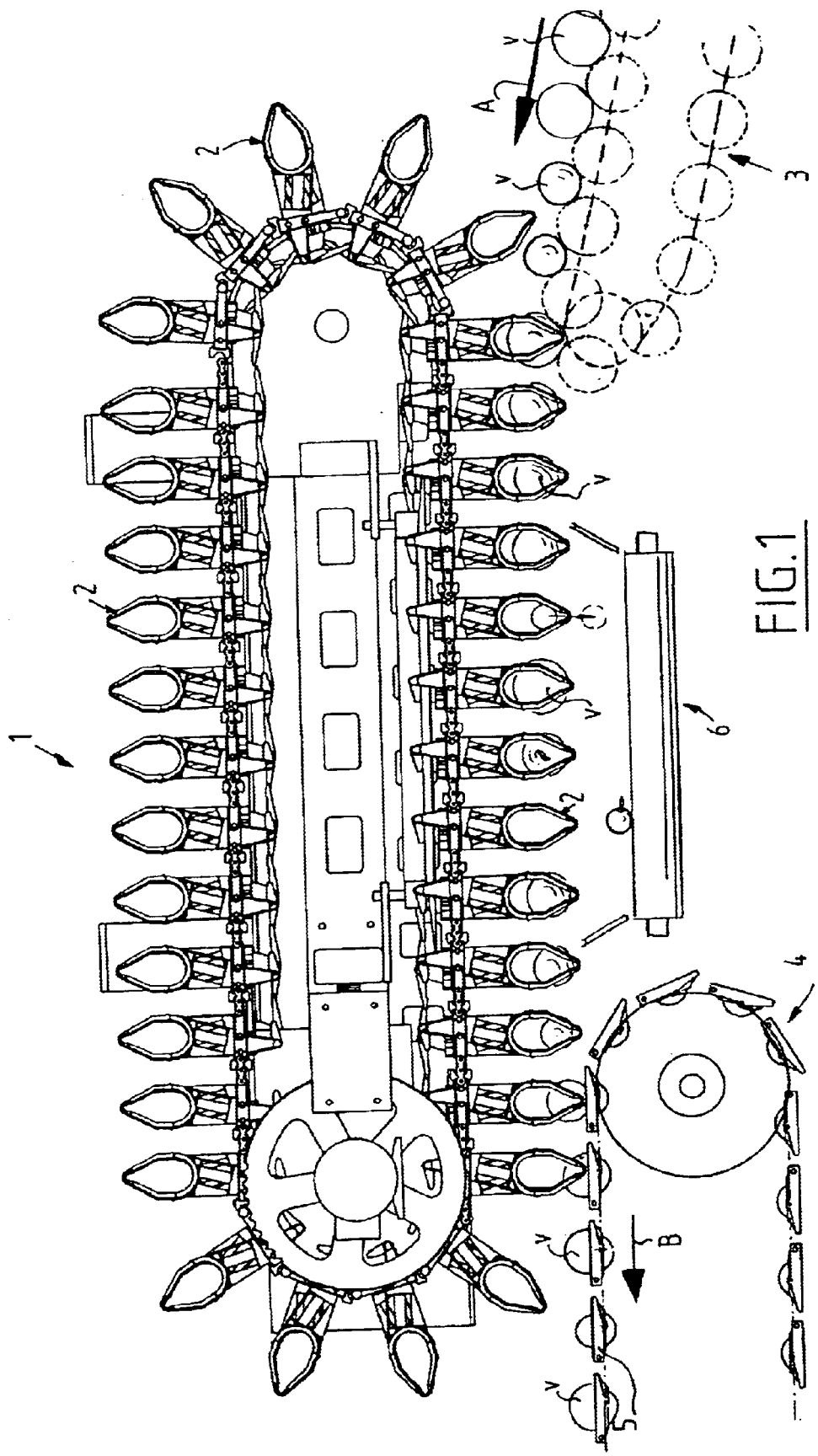
FIG. 1 is a side view of a first preferred embodiment of an apparatus according to the present invention.
Figure 7:
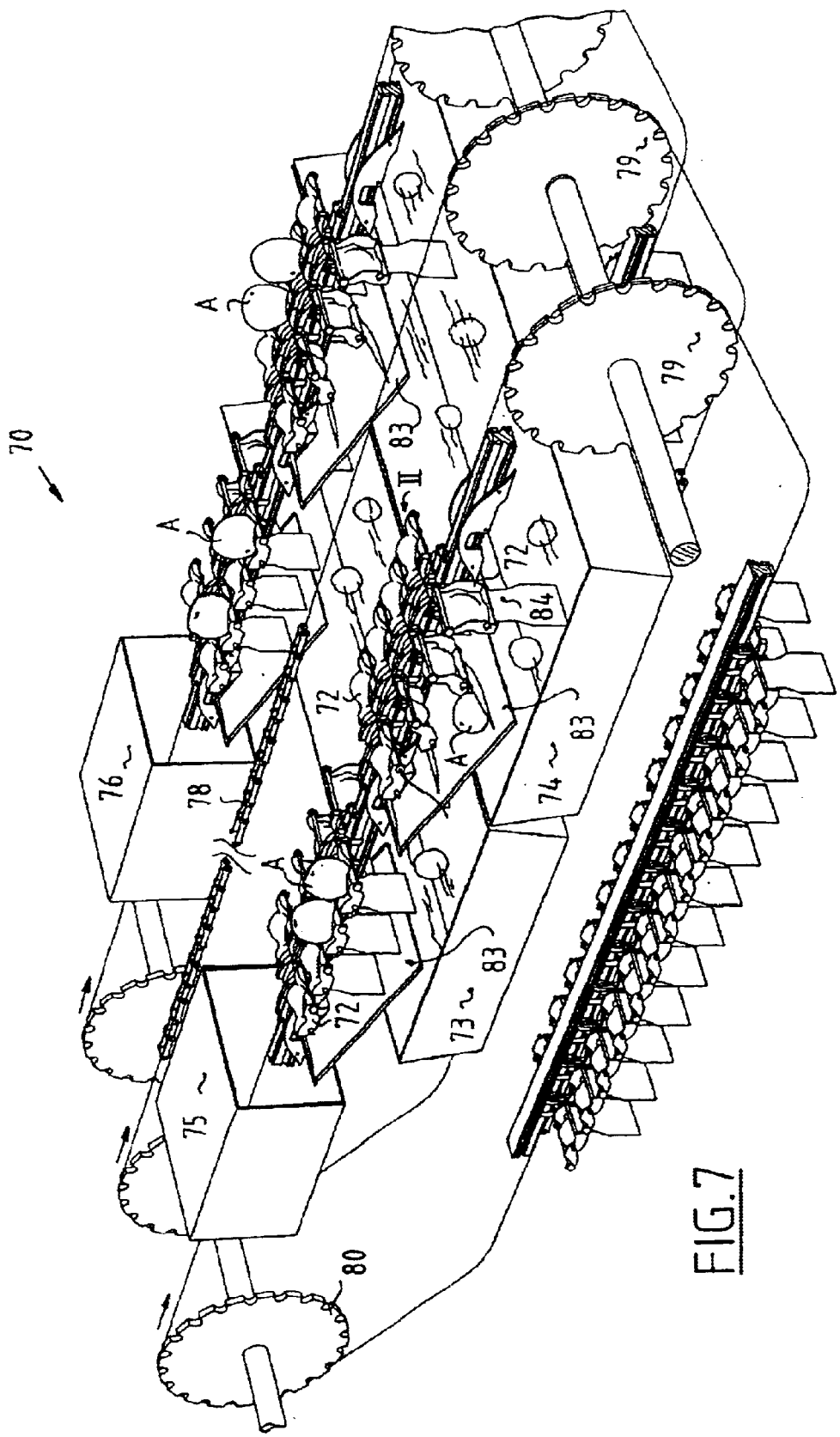
FIG. 7 is a partially schematic, sectional view of a preferred embodiment of an apparatus according to the present invention.

With an apparatus 70 (FIG. 7) according to the present invention, vulnerable products, such as apples A, are transported by means of fruit carrier 72 to discharging positions, preferably water channels 73 and 74, two of which are shown in FIG. 1, whilst in practice dozens of discharging positions are available, at which positions the fruits can be sorted according to size, weight, quality, colour and the like. In FIG. 7, housings 75, 76 are indicated highly schematically, in which housings cameras for sorting the fruits A according to colour may be disposed, for example. The fruit carriers 72 are transported by means of endless chains 78, which circulate via chain wheels 79 and 80. If a fruit is to be discharged at discharging location 74, a fruit carrier is released at that location, so that said fruit carrier will tilt about a pin 72 and fruit A will be discharged via a sloping surface 83 and a slab 84 that is attached to fruit carrier 72.

As is apparent from FIGS. 8 and 9, a unit 30 consisting of two fruit carriers 72, each fitted with a slab 84, is provided with hook ends 91 and 92 for connecting unit 90 to (and above) chain 78 and to a rail 94 extending below chain 78, respectively. Nose lips 93 ensure the fixation in longitudinal direction with respect to chain 78.

The fruit carriers are S-shaped in section, both in the conveying direction and in a direction transversely thereto. In practice said S-shaped section has provided to be suitable for various types of fruits. The S-shape in transverse direction enables proper engagement of the fruits present in carriers 72 by the grippers—see for example Dutch patent application no. 1016168 (not pre-published).

Since the fruit carriers are disposed relatively high with respect to the chain, the fruits can be readily engaged therein and/or be deposited therein, for example by means of the aforesaid grippers. The use of grippers makes it possible to increase the velocity of the fruit carriers, whilst the presence of the slab does not result in a greater spacing between the fruit carriers.

Hook ends 95 are present on either side of the product carriers 72, which hook ends are engaged in a snap mechanism 96 in the conveying position, which snap mechanism comprises an operating lever 97 and a springing portion 98, which snap mechanism is preferably integrally formed of plastic material with a carrier and/or a central portion 100 of unit 90.

Figure 8:
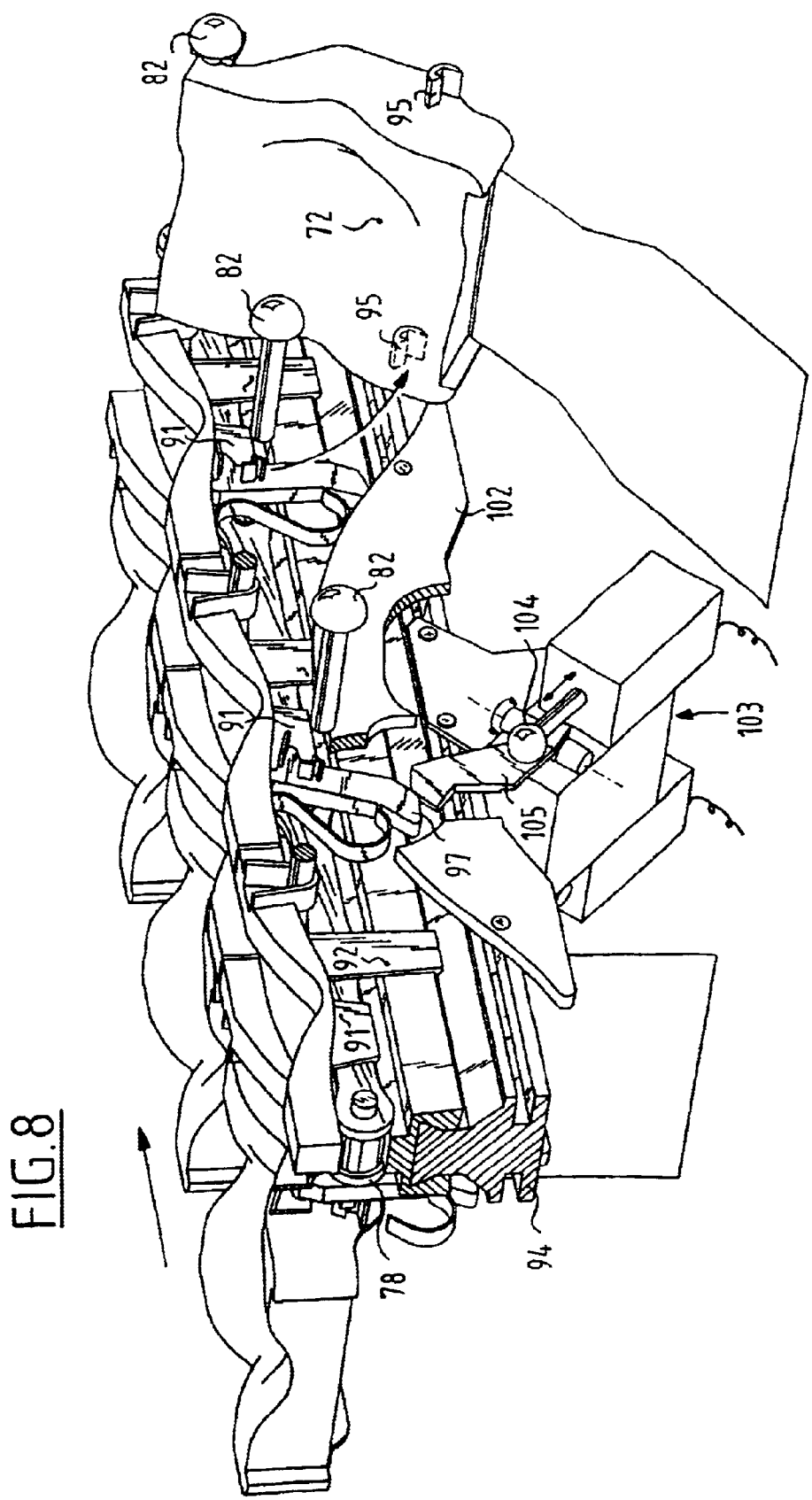
FIG. 8 is a perspective view of detail II in FIG. 1.
Figure 9:
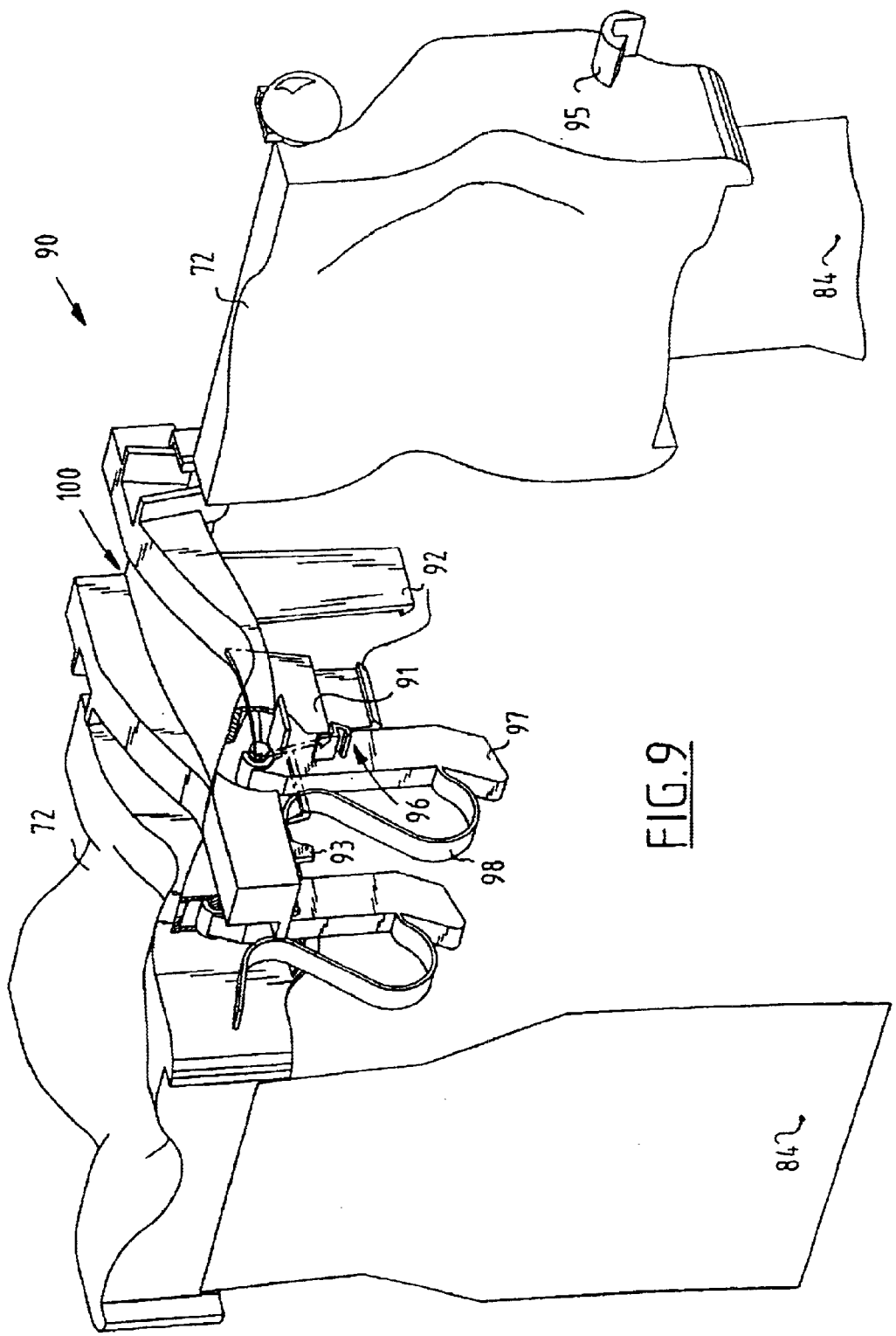
FIG. 9 is a perspective view of a unit as used in the apparatus according to FIGS. 1 and 2.

As is apparent in particular from FIG. 8, a guide element 102 is provided near every discharging position, such as the one at water channel 74, which guide element forms a curved track along which the fruit carriers are guided, that is, along the downward flank of the curved track during discharging and along the upward flank after discharging at a preceding discharging position so as to return the fruit carriers to the conveying position. An actuating mechanism 103 is provided near guide element 102 for moving a fruit carrier 72 from the conveying position to the discharging position. Said mechanism 103 comprises an electrically actuated rod 104, which actuates lever 105 upon upward movement, which lever in turn actuates the lever 97 of a respective fruit carrier unit, as a result of which the hook 95 is detached from the snap mechanism 96 and the fruit is carefully discharged as a result of the presence of the downward flank of curved element 102, guide plate 83 and slab 84. The invention is not restricted to the above-described preferred embodiments thereof; the rights applied for are determined by the claims hereinafter, within the scope of which all kinds of modifications are conceivable.

What is claimed is:

1. An apparatus for conveying a product, comprising
   at least one elongate sliding element having an axis, and
   at least one gripper, the gripper comprising a first gripper portion and an opposed second gripper portion for applying a gripping force to the product along a direction substantially between the first and second gripper portions,
   wherein the gripper portions are operatively connected to the at least one sliding element and are movable, substantially in the direction of the gripping force, along the axis of the at least one sliding element and wherein the gripper portions are sized and shaped to grip substantially along the whole sides of the product to be gripped.

2. Apparatus according to claim 1, wherein said at least one sliding element comprises at least one rod, over which said gripper portions are movable.

3. Apparatus according to claim 1, wherein said gripper portions comprise cam members for moving said first and second gripper portions with respect to one another against a spring force.

4. Apparatus according to claim 1, further for discharging vulnerable products, such as fruits, further comprising:
   product carriers that can be moved in the conveying direction;
   tilting means for causing the product carriers to tilt at a specific conveying position, so as to discharge the product from the product carrier in rearward direction, seen in the conveying direction, at said conveying position;
   wherein a product carrier is provided laterally of a conveying element, wherein the product carrier can be returned to the conveying position after the fruit has been discharged, and wherein a flexible element is disposed on the rear side of the product carrier for the purpose of discharging the product from the product carrier in a controlled manner,
   wherein the product carrier has a concave shape when viewed in cross section in the conveying direction and when viewed in cross section in a transverse direction.

5. Apparatus according to claim 1, further for discharging vulnerable products, such as fruits, further comprising:
   product carriers that can be moved in the conveying direction;
   tilting means for causing the product carriers to tilt at a specific conveying position, so as to discharge the product from the product carrier in rearward direction, seen in the conveying direction, at said conveying position;
   wherein a product carrier is provided laterally of a conveying element, wherein the product carrier can be returned to the conveying position after the fruit has been discharged, and wherein a flexible element is disposed on the rear side of the product carrier for the purpose of discharging the product from the product carrier in a controlled manner.

6. Apparatus according to claim 1, further comprising:
   an endless chain operatively connected to the at least one gripper for moving the gripper in a conveying direction, and
   a chain tensioning device operatively connected to the endless chain.

7. Apparatus according to claim 1, wherein said at least one gripper further comprises an open frame and a cover enveloping said frame.

8. Apparatus according to claim 1, further for discharging vulnerable products, such as fruits, further comprising:
   product carriers that can be moved in the conveying direction;
   tilting means for causing the product carriers to tilt at a specific conveying position, so as to discharge the product from the product carrier in rearward direction, seen in the conveying direction, at said conveying position;
   wherein a product carrier is provided laterally of a conveying element, wherein the product carrier can be returned to the conveying position after the fruit has been discharged, and wherein a flexible element is disposed on the rear side of the product carrier for the purpose of discharging the product from the product carrier in a controlled manner,
   wherein said tilting means comprise a locking mechanism for locking said product carrier in the conveying position and releasing said product carrier to enable movement thereof to the discharging position.

9. Apparatus according to claim 8, wherein water channels are provided near the discharging position, in which the discharged products are carried off.

10. Apparatus according to claim 8, wherein the products are carried off by means of one or more conveyor belts at the discharging position.

11. Apparatus according to claim 8, wherein said conveying element is a chain, and wherein a product carrier is provided on either side of said chain.

12. Apparatus according to claim 8, wherein a number of chains are interconnected.

13. Apparatus according to claim 8, wherein said locking mechanism includes a snap mechanism.

14. Apparatus for transferring vulnerable products, such as fruits, from a supply conveyor to a discharge conveyor, comprising:

a frame;

a weighing element;

at least one gripper suspended in the frame and sized and shaped to hold the vulnerable product, the at least one gripper comprising at least one contact element for weighing the vulnerable product while the vulnerable product is being transferred, wherein the at least one contact element comprises an easily slideable material, and wherein the at least one gripper comprises at least three contact elements.

15. Apparatus according to claim 14, wherein said at least one contact element is sized and shaped to pass over part of a force measuring device operatively connected to the weighing element.

16. Apparatus according to claim 14, which apparatus further comprises an endless chain operatively connected to the at least one gripper for moving the gripper in a conveying direction, and a chain tensioning device operatively connected to the endless chain.

17. Apparatus according to claim 14, wherein said at least one gripper further comprises an open frame and a cover enveloping said frame.

18. An apparatus according to claim 14, wherein the easily slideable material comprises a resilient plastic.

19. An apparatus according to claim 14, wherein the at least one gripper comprises three contact elements.

20. A method for conveying and discharging one or more objects, wherein:

the objects are separated from each other in a singling device;

the individual objects are taken out of said singling device by means of an apparatus according to claim 1 and transferred to a conveyor fitted with product carriers, during which transfer the individual objects are weighed; and wherein said objects are discharged from the conveyor with the product carriers, by tilting said product carriers and causing the objects to move past a flexible element.

21. Method for conveying and discharging one or more fruits, wherein:

the fruits are separated from each other in a singling device;

the individual fruits are taken out of said singling device by means slideably moving grippers along at least one sliding element substantially in the direction of the gripping force, along the axis of the at least one sliding element, whereby the gripper portions are sized and shaped to grip substantially along the whole sides of the fruits, and transferred to a conveyor fitted with product carriers, during which transfer the individual fruits are weighed; and wherein said fruits are discharged from the conveyor with the product carriers, by tilting said product carriers and causing the fruits to move past a flexible element.

22. An apparatus comprising two product carriers, each said product carrier comprising a locking mechanism for selectively locking said product carrier in a conveying position and selectively releasing said product carrier to enable movement thereof to a discharging position, the product carriers connected to one another by a central portion for detachable attachment to a chain.

23. Method for conveying and discharging one or more fruits, comprising:

moving products carriers containing the fruits in a conveying direction, each said product carrier comprising a locking mechanism for selectively locking the product carrier in a conveying position and selectively releasing said product carrier to enable movement thereof to a discharging position, the product carriers being connected to one another by a central portion for detachable attachment to a chain;

actuating the locking mechanism to tilt the respective product carriers to the discharging position, and discharging the respective fruits in a rearward direction from said product carriers into a water channel; and wherein the fruit is slowed down upon being discharged by means of a flexible element which is attached to the rear edge of the product carrier.

* * * * *